United States Patent [19]

Habegger

[11] 4,285,119

[45] Aug. 25, 1981

[54] METHODS AND APPARATUS FOR USE IN PRODUCING WOUND COILS AND PLACING SUCH COILS ON MAGNETIC CORES

[75] Inventor: Richard J. Habegger, Woodburn, Ind.

[73] Assignee: General Electric Company, Fort Wayne, Ind.

[21] Appl. No.: 34,492

[22] Filed: Apr. 30, 1979

[51] Int. Cl.³ ............................................. H02K 15/06
[52] U.S. Cl. ........................................ 29/596; 29/734; 29/736
[58] Field of Search ................. 29/596, 598, 732, 734, 29/736, 564.1

[56] References Cited

U.S. PATENT DOCUMENTS

| 3,324,536 | 6/1967 | Hill | 29/734 |
|---|---|---|---|
| 3,402,462 | 9/1968 | Walker et al. | 29/596 |
| 3,579,818 | 5/1971 | Arnold et al. | 29/596 |
| 3,698,063 | 10/1972 | Smith | 29/734 |
| 3,714,973 | 2/1973 | Kieffer et al. | 29/596 |
| 3,765,080 | 10/1973 | Lauer | 29/596 |
| 3,829,953 | 8/1974 | Lauer et al. | 29/734 |
| 3,872,568 | 3/1975 | Morr | 29/734 |
| 3,872,897 | 3/1975 | Droll et al. | 29/596 |
| 3,874,424 | 4/1975 | Muskulus | 140/92.1 |
| 3,888,638 | 6/1975 | Walker | 29/734 |
| 3,964,525 | 6/1976 | Arnold et al. | 29/596 |
| 3,973,601 | 8/1976 | Arnold et al. | 29/596 |
| 3,977,444 | 8/1976 | Lauer et al. | 140/92.1 |
| 4,106,185 | 8/1978 | Lauer | 29/596 |
| 4,151,636 | 5/1979 | Lauer et al. | 29/596 |

OTHER PUBLICATIONS

"Winding and Inserting Unit with Automatic Conveying System", Pub. No. 1.11.IX.71.10, by Fickert, available before 4/73.

Primary Examiner—Carl E. Hall
Attorney, Agent, or Firm—Ralph E. Krisher, Jr.

[57] ABSTRACT

A method of utilizing a coil injection tool pack, also referred to as coil injection tooling, is disclosed. The method involves placing a tool pack in winding turn receiving relationship with coil winding apparatus having a tool pack nest. The tool pack is moved laterally, relative to the longitudinal extent of the elongate elements, toward the tool pack nest at the winding station. Thereafter, mutual alignment of the tool pack and tool pack nest is assured, and the base of the tool pack is clamped against a tool pack retainer means. Dynamoelectric machine windings are then draped on the tooling pack and subsequently, the tool pack is released and transported to a tool pack nest on a coil injection machine power unit. The tool pack then is clamped on the power unit, a core is placed on the tool pack, and winding turns previously disposed on the tool pack are axially injected into the stator core. In a more preferred approach, the tool pack nest at the coil injection machine power unit is activated by positioning the tool pack at the nest, and then depressing the nest in order to assure mutual alignment of the tool pack and the nest.

28 Claims, 5 Drawing Figures

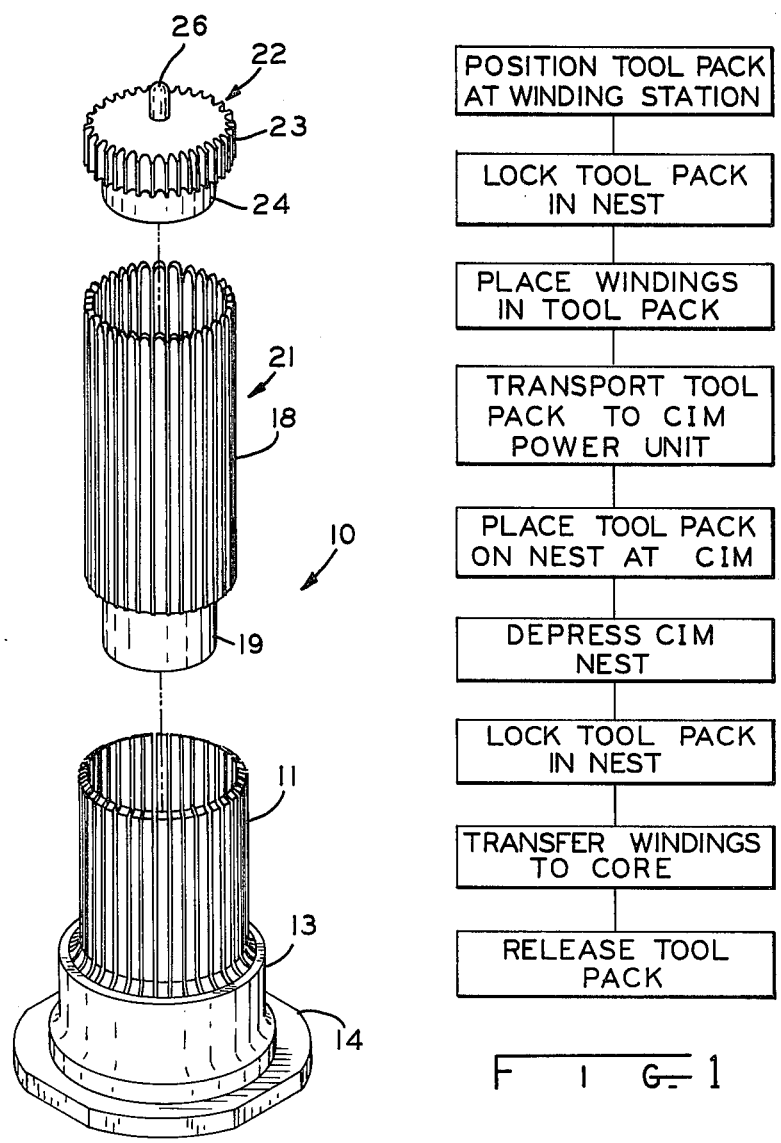

METHODS AND APPARATUS FOR USE IN PRODUCING WOUND COILS AND PLACING SUCH COILS ON MAGNETIC CORES

CROSS REFERENCE TO RELATED APPLICATIONS AND PATENTS

The subject matter of this application is generally related to the subject matter contained in Lauer and Smith U.S. Pat. No. 4,151,636 having an issue date of May 1, 1979; Lauer U.S. Pat. No. 4,106,185 which issued Aug. 15, 1978; Lauer et al U.S. Pat. No. 3,977,444 which issued Aug. 31, 1976; and Lauer U.S. Pat. No. 3,829,953 which issued Aug. 20, 1974. All of the just-mentioned patents are assigned to the assignee of this application, and the entire disclosures of all of such just-mentioned patents are specifically incorporated herein by reference.

BACKGROUND OF THE INVENTION

This invention relates generally to improved methods and apparatus for use in developing, handling, and axially placing wound coils for dynamoelectric machines.

Apparatus and methods for developing wound coils for use in dynamoelectric machines such as electric motors are, generally, now well known in the art. Also known in the art are equipment and processes for axially placing or injecting prewound coils into the slots of magnetic cores.

In connection with the manufacture of electric motors, it has now been recognized that substantial economies may be realized by utilizing tools that are movable between winding and injecting stations, with the tools being such that they are completely separable from basic winding and injecting equipment. Thus, earlier patents in this art have shown, inter alia, tools that are supported on conveyor means such as a turntable as illustrated for example in Arnold et al U.S. Pat. No. 3,579,818 of May 25, 1971.

Another approach is shown, for example, in the above referenced Lauer U.S. Pat. No. 4,106,185 and the above referenced Lauer and Smith U.S. Pat. No. 4,151,636 wherein coil injection blades are movable from point to point within a coil developing and placing system. Still another approach, which requires a special conveyor system, is described in Muskulus U.S. Pat. No. 3,874,424 of April, 1975, and a publication by Fickert Spezialmaschinen GMBH & Co. KG identified as Publication 1.11.IX.71.10 for "Winding and Inserting Unit With Automatic Conveyor System".

The approaches illustrated heretofore are, for the most part, usable in highly automated situations. However, at many plant locations, physical volume or other factors are such that economic justification cannot be made for fully automated motor manufacturing lines. Accordingly, it would be desirable to provide improvements in manufacturing processes and equipment whereby some of the advantages of automation and increased machine utilization may be realized without being committed to full scale automation. It would be particularly desirable to provide improved processes and apparatus which would lend themselves to an evolving full automation situation.

The approaches illustrated heretofore also, for the most part, involve processes and equipment that are relatively inflexible in terms of manual manipulations. Accordingly, it would also be desirable to provide new and improved apparatus and processes such that manual operations and manipulations may be readily performed, and when economically justifiable, wherein such manual operations and manipulations may be replaced by automatic means.

Accordingly, it is a general object of the present invention to provide new and improved methods and apparatus whereby motor manufacturing techniques known heretofore may be carried out relatively quickly without the need for complex automated material transporting systems and yet which are adaptable to automated transporting techniques.

A more specific object of the present invention is to provide new and improved processes and equipment involving coil injection tooling packs which may be easily disconnected from coil injection machine power units and which may be easily transported either manually or by machine between winding and coil injection stations.

It is a more specific object of the present invention to provide methods and apparatus that result in a higher degree of utilization of a coil injection machine power unit without requiring exorbitant investment in fully automated motor manufacturing assembly lines.

SUMMARY OF THE INVENTION

In carrying out the above and other objects of the present invention in one form thereof, I provide a method of utilizing a coil injection tool pack, also sometimes referred to as coil injection tooling, which involves placing a tool pack (that includes a plurality of elongate elements that mutually define a plurality of axially extending gaps spaced apart about the periphery of the tool pack, a base supporting the elongate elements, and preferably wedge guides and a wedge guide housing) in winding turn receiving relationship with coil winding apparatus having a tool pack nest. Preferably, the coil winding apparatus is of the "shedder type" now known in the art. A preferred method involves moving the tool pack laterally, relative to the longitudinal extent of the elongate elements, toward the tool pack nest at the winding station. Thereafter, a portion of the base of the tool pack is disposed adjacent to means for retaining the tool pack at the winding station and the tool pack is positioned in overlying relationship with respect to aligning means for assuring mutual alignment of the tool pack and the tool pack nest. Subsequently, the aligning means are moved axially, relative to the longitudinal extent of the elongate elements so as to cause the aligning means to assure mutual alignment of the tool pack and tool pack nest. In preferred forms, this action also causes the base of the tool pack to be clamped against a tool pack retainer means at the winding station.

Dynamoelectric machine windings are then draped in the tooling pack and, depending upon the specific method followed, the tool pack may be indexed relative to a winding head in a manner known heretofore.

Subsequently, the tool pack is released and transported for example by hand carrying, manual sliding on a support or conveyor, or moving as an integral part of an index table or other mechanism, to a tool pack nest that is provided on a coil injection machine power unit. Thereupon, the tool pack is clamped in place on the coil injection machine power unit, a core is placed on the tool pack, and winding turns previously disposed on the tool pack are axially injected into the stator core. In a more preferred approach, the tool pack nest at the coil injection machine power unit is activated by positioning the tool pack at the nest, and then depressing the nest in order to assure mutual alignment of the tool pack and the nest. Depression of the tool pack nest at the coil injection power unit then automatically actuates a mechanism for holding the tool pack in the desired position on the coil injection machine.

During the coil injection process per se, a pair of friction coupled driving members engage and couple with the tool pack and are effective to cause automatic injection of windings into a magnetic core supported on the tool pack. The approach disclosed herein is completely flexible and wedges may also be positioned in slots of the magnetic core during the coil injection process.

In one modification of the above-described approaches, the tool pack is positioned adjacent to the winding station tool pack nest, moved laterally in position at such nest and an auxiliary support is then moved axially relative to the tool pack to cause at least a portion of the tool pack base to be clamped by a retainer means.

Other objects of the present invention and their attendant advantages will become readily apparent from the following description taken in conjunction with the accompanying figures in which like reference characters are used to describe like parts throughout the several views.

BRIEF DESCRIPTION OF THE DRAWINGS

FIG. 1 is a flow chart of procedural steps that may be utilized when practicing the methods of the present invention in one form thereof;

FIG. 2 is an exploded perspective of a new and improved tool pack embodying the present invention in one form thereof and which may be utilized while practicing the present invention;

DESCRIPTION OF THE PREFERRED EMBODIMENTS

Figure 3:
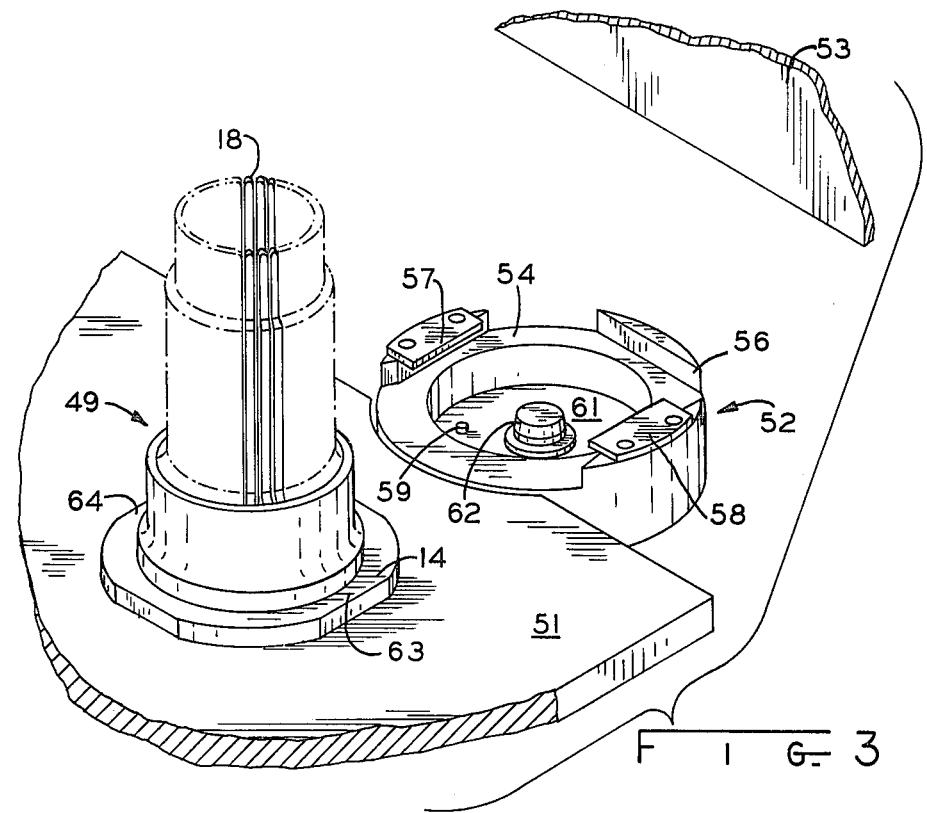
FIG. 3 is a perspective view which shows the tool pack of FIG. 2 positioned in preparation for manual transfer to a tool pack nest at a winding station.

FIG. 1 is a generally self-explanatory flow chart of a plurality of procedural steps that are followed while practicing the present invention in one preferred form thereof. FIG. 2, on the other hand, is an exploded perspective view of a tool pack 10 that embodies some inventive features and which preferably is utilized in carrying out the presently preferred methods embodying the present invention. The tool pack 10 includes a plurality of wedge guides 11 fastened, e.g. by screws 12 (see FIG. 5) to a wedge guide housing 13. The wedge guide housing 13, in turn is connected to and supported by a base 14 (e.g. by means of screws 16 and dowel pins 17-see FIG. 5). Normally disposed within the wedge guides and wedge guide housing are a plurality of elongate elements that define axially extending gaps and, in the structure shown in FIGS. 1 and 5, such elongate elements are in the form of a plurality of axially extending pins or blades 18. The pins 18 along with a base 19 make up a blade assembly 21.

Figure 5:
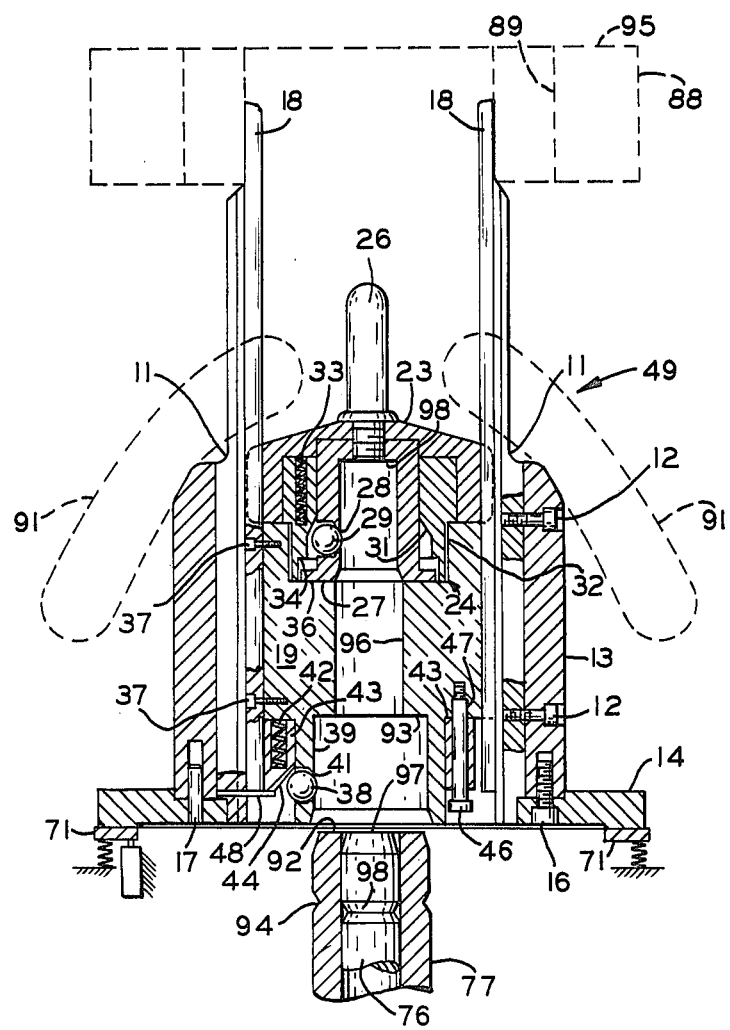
FIG. 5 is a side elevation, with parts removed, parts in section, and parts broken away illustrating the tool pack of FIG. 2 after it is in place at a coil injection station and just prior to transfer of windings from the tool pack to a magnetic core.

Also shown in both FIGS. 2 and 5 is a stripper assembly 22 which includes a stripper 23, cam assembly 24, and locking screw 26.

The blade assembly 21 and stripper assembly 22 will now be described in more detail with specific reference to FIG. 5. Thus, the cam assembly 24 includes an inner sleeve 27 that is provided with at least two (and preferably three) openings 28 through which a portion of balls 29 may be urged by the inclined cam surface 31 which is formed on the outer cam sleeve 32. The outer cam sleeve 32 and inner sleeve 27 are movable relative one to another in an axial direction under the influence of at least three soft coil springs 33 which are trapped in holes that are bored into the outer cam sleeve 32. Thus, when the stripper 23 is in an elevated position relative to base 19, the coil springs 33 expand and cause the outer sleeve 32 to move downwardly relative to the inner sleeve 27 so that the cam surface 31 will urge the balls 29 outwardly through the openings 28. This action will interlock the stripper assembly with a driving member, all as will be discussed in more detail hereinbelow. It will be noted with reference to FIG. 5 that ledges 34 would bear against flange 36 and prevent outer sleeve 32 from slipping past inner sleeve 27 during normal operation of the structure shown in FIG. 5. Moreover, the entire stripper assembly is maintained in assembled relationship with the locking screw 26 which is threadably received by the inner sleeve 27.

With continued reference to FIG. 5, it will be appreciated that the pins or blades 18 are interconnected with the base 19 by means of screws 37 and thus any movement of base 19 will be accompanied by corresponding movement of the pins 18. The base 19 also includes a ball and cam mechanism which includes at least two and preferably three balls 38 which are movable into a bore 39 defined by the base until further movement of the balls is limited by the holes 41 which are sized to be less than the diameter of the balls 38. Balls 38 are urged into interfering relationship with the bore 39 when the base 19 is moved upwardly as viewed in FIG. 5, whereupon coil springs 42 (preferably three in number) expand and cause camming member 43 to move downwardly relative to the base 19 so that cam surface 44 will engage the ball or balls 38 and urge them into interferring relationship with the bore 39. It will be noted that camming member 43 is retained in assembled relationship with the base 19 by means of a fastening means. This fastening means preferably is in the form of at least two screws 46 which are provided with bushing surfaces 47 along which the cam ring or member 43 is slideable during actuation of the mechanism. A dowel pin 48 is carried by the wedge guide—wedge guide housing—base assembly so that with the relative position of parts shown in FIG. 5 the weight of the stripper assembly 26 and blade assembly 21 will be supported by the pin 48. The weight of these respective assemblies also are such that the coil springs 43, 44 are compressed with the result that the balls 28, 29 will not perform a locking function.

Turning now to FIG. 3, it will be appreciated that the entire tool pack of FIG. 1 has been denoted by the general reference numeral 49 and that parts thereof have been shown in phantom in order to reduce repetitive drawing detail. In FIG. 3, the tool pack 49 is supported on a platform or supporting surface 51 at a winding station. The winding station includes a tool pack nest generically denoted by the reference numeral 52 and a shedder type winding head which is hidden from view by the opaque safety guard surface 53. However, the winding head that forms part of the apparatus of FIG. 3 is substantially the same as that shown in Lauer U.S. Pat. No. 3,765,080 or in any one of a number of other patents such as Arnold et al U.S. Pat. No. 3,964,525 and Arnold et al U.S. Pat. No. 3,973,601. Alternatively, of course, the shedder type winding head may be as shown for example in Droll U.S. Pat. No. 3,872,897 which issued Mar. 25, 1975. Furthermore, it should be appreciated that still other types of winding heads may be utilized where windings are developed directly within the tool pack. Examples of other known equipment for accomplishing this purpose are contained in Muskulus U.S. Pat. No. 3,874,424 which issued Apr. 1, 1975; and Kieffer et al U.S. Pat. No. 3,714,973 which issued Feb. 6, 1973. Since details concerning the preferred shedder type winding heads that would form part of the apparatus shown in FIG. 3 have now been published in the art, along with alternate types of winding heads (as evidenced for example by the above-mentioned Muskulus and Keiffer patents), the details of such winding heads are not included in the drawings attached hereto. However, the disclosures of all of the just mentioned winding head patents are specifically incorporated herein by reference.

With continued reference now to FIG. 3, the tool pack 49 is slid into the nest 52 with bottom surface areas of the base 14 supported on the supporting surface 54 of the nest 52. It will be noted that the nest 52 includes a backstop 56 and a pair of spaced retaining plates 57, 58. The nest 52 also includes means for insuring mutual alignment of the nest and the tool pack 49 which have been illustrated in the form of a pin 59 carried by a movable support in the form of a movable surface 61 which carries with it a centrally located plug 62. During the dwell or rest period for the nest 52, the surface 61 is spaced approximately three-quarters of an inch (19 mm) below the supporting surface 54. Thus, the tool pack 49 may initially be slid onto the supporting surface 54 and at that time, the tool pack simply overlies the pin 59, plug 62, and surface 61. However, when the tool pack 49 is positioned against the backstop 56, the blades 18 will be properly aligned with the coil forming tooling carried by the not shown winding head and thus the tool pack 49 will be in a position to receive winding turns as they are generated by the winding head. After the tool pack 49 has been positioned against backstop 56, an operator may depress either a foot pedal or a pair of palm actuated buttons to initiate a machine cycle. The winding machine cycle commences by the action of a suitable fluid cylinder raising the surface 61, plug 62, and alignment pin 59 upwardly against the bottom of the base 14 of the tool pack. Assuming that the tool pack 49 is properly aligned on the nest, the plug 62 will enter within the bore 39 (see FIG. 5) of the base 19. In addition, the alignment pin 59 will enter a recess formed in the bottom of the base 14. Concurrently, the surface 61 will elevate the entire tool pack 49 until the upper surface portions of the base 14 bear against the bottom surface of the retaining plates 57, 58 and thus the tool pack 49 will be securely locked in the winding machine nest. Movement of the supporting surface 61 to its full extent will cause actuation of a not shown limit switch and the winding machine will then proceed to cycle in its normal fashion. However, if relative misalignment between the tool pack 49 and the nest 52 prevents entry of the pin 59 into the associated hole in the bottom of base 14, engagement of the surfaces 63, 64 with the retaining plates 57, 58 will prevent further movement of the surface 61 and closure of the aforementioned limit switch. Failure of the limit switch to be made or closed will prevent the winding equipment from commencing its automatic cycle and thus signal the operator that realignment of the tool pack and nest is required. During formation of two or more poles of windings, it will be appreciated that the tool pack 49 must be indexed relative to the winding head. This is accomplished by means of a not shown gearing arrangement which is interconnected with the tool pack nest 52 and which automatically rotates the nest 52 at the appropriate times during a winding cycle. Rotation of the nest 52 necessarily causes a corresponding rotational index of the tool pack 49 and further description of this principle is not included herein in view of the now well known state of the art regarding such indexing of winding receiving mechanisms. After the desired number of windings have been developed within the tool pack 49, the winding machine automatically completes its cycle, the surface 61 is lowered, and the tool pack 49 is no longer retained locked in the nest 52. Thereupon, the operator manually slides the tool pack back to the table surface 51 and then either carries or uses a conveyor to transport the tool pack 49 (having windings draped thereon) to the power unit of a coil injection machine. The upper portion of a coil injection machine power unit 67 has been shown in FIG. 4 and parts of the same power unit have been shown in FIG. 5. More specifically, the tool pack 49 is slid across the upper surface 68 of the unit 67 and positioned on the coil injection machine tool pack nest 69. The nest 69 includes an outer ring 71 which is normally supported by springs so as to be level or flush with the surface 68. Disposed within the outer ring is a stationary surface 72 which carries a plurality of alignment pins 73 and which has a central bore which accommodates the upper end of a conventional wedge storage magazine 74 as well as a pair of actuating rods 76, 77.

It will be recognized that the coil injection machine power unit includes conventional core clamping means illustrated as a pair of pivoting clamps 78, the vertical position of which is controlled by the action of supporting rods 79. Since the details concerning operation of the rods 79, clamps 78, and wedge storage magazine 74 are now well known in the art and are described for example in Lauer U.S. Pat. No. 3,829,953 of Aug. 20, 1974; Hill U.S. Pat. No. 3,324,536 of June, 1967; Walker et al U.S. Pat. No. 3,402,462 of Sept., 1968; Smith U.S. Pat. No. 3,698,063 of Oct. 17, 1972; and Moore U.S. Pat. No. 3,872,568 of Mar., 1975; further details concerning those parts of the coil injection machine power unit are not specifically illustrated herein. However, the entire disclosures of all of the just referenced patents relating to coil injection machines are specifically incorporated herein by reference.

Figure 4:
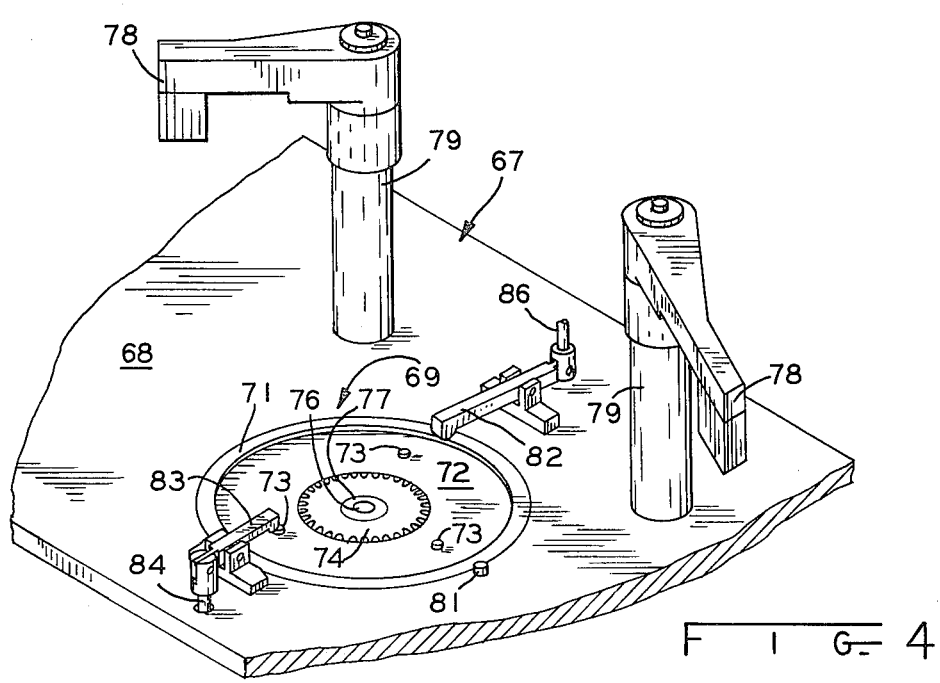
FIG. 4 is a view in perspective of the top of a coil injection machine power unit, clearly revealing a tool pack nest at a coil injecting station.

When coupling the tool pack 49 with the coil injection machine power unit of FIG. 4, an operator slides the tool pack transversely relative to the longitudinal extent of the axially extending blades 18 onto the supporting nest ring 71 shown in FIG. 4. Proper positioning of the tool pack 49 on the coil injection machine nest is determined when a side of the base 14 engages the stop pin 81 shown in FIG. 4. At that time, the base 14 is supported by the supporting ring 71. Thereupon, the operator depresses the tool pack 49 and thereby depresses the ring 71. Assuming that the tool pack 49 is properly aligned on the nest, the stationary pins 73 will enter recesses in the bottom surface of the base 14 and the tool pack 49 will be depressed along with ring 71 until the lower surface of the base 14 comes to rest against the stationary surface 72. In actual practice, the pins 73 project approximately three-sixteenths of an inch (4.8 mm) above the stationary surface 72. Moreover, the upper end of the pins 73 are approximately level or flush with the upper surface of the nest ring 71. Thus, as the operator depresses the tool pack 49 a slight movement of the tool pack 49 will quickly establish proper alignment of the tool pack 49 with the pins 73. Then, after the tool pack 49 has been depressed along with the ring 71 a distance of approximately three-sixteenths of an inch (about 4.8 mm), a limit switch 100 is closed (see FIG. 5) which energizes locking means that lock the tool pack in the depressed aligned condition thereof. Such locking means have been illustrated in FIG. 4 as including clamp arms 82, 83 which are driven to the locking position thereof by rods 84, 86 and are controlled by small pneumatic cylinders. The control valves for the pneumatic cylinders in turn are controlled by limit switch 100 which is closed when ring 71 has been fully depressed. Thus, manual depression of ring 71 is effective to cause actuation of clamp arms 82, 83 which engage the upper surface of the tool pack base 14 and hold the tool pack in its depressed, aligned condition. At this point in time, the coil injection machine is ready for operation in an essentially conventional manner for transferring winding turns from the tool pack into the axially extending slots of a magnetic core. For completeness of disclosure, it is noted that the nest ring 71 is supported by a plurality of compression springs 99 (see FIG. 5) which are sufficiently stiff to hold the tool pack 71 in an elevated position. However, these same springs are sized and chosen so that a downward force of approximately five to seven pounds exerted manually by an operator will overcome the springs to cause the proper actuation of the clamp arms 82, 83 previously discussed. The clamp arms themselves 82, 83 in turn are actuated with a sufficient force to continue to overcome the suspension springs 99 for the ring 71. However, at the end of a cycle when the clamp arms 82, 83 are released, the suspension springs for the ring 71 will raise the ring and tooling so that it may be readily moved away from the tool pack nest at the coil injection station.

A further description of the coil injection cycle will now be provided with reference once again to FIG. 5. FIG. 5 shows the tool pack 49 in its aligned and locked condition on the tool pack nest at the coil injection station. It will be noted that a magnetic core 88 having axially extending slots 89 as shown in phantom lines has been shown in its initial position on the tool pack 49. Moreover, phantom lines represent windings 91 that were placed on the blades 18 at the winding station. When the operator initiates the coil injection cycle by depressing a foot pedal or a pair of palm buttons, the coil injection mechanism is actuated. As will be understood by persons of ordinary skill in the art, wedge pushers thereupon are driven upwardly in order to dispense wedges from the wedge magazine 74 (see FIG. 4) and upwardly along the wedge guides 11. Also driven upwardly will be the main drive rod 76. A not shown frictional coupling couples the drive rod 76 with the outer drive rod 77 so that outer drive rod 77 will travel concurrently with the inner drive rod 76 until a stop carried by the outer drive rod 77 engages a fixed stop in the coil injection machine. Thereupon, the inner drive rod 76 will continue to move upwardly to complete the coil injection process.

During an initial increment of travel of the drive rod 76, the drive rod 77 will move therewith. Thus, shortly after this initial increment of travel commences, the upper end of rod 77 will bear against the shoulder 93 of the base 19 and continued movement of drive rod 77 will raise base 19 and blades 18 upwardly as viewed in FIG. 5. As the base 19 moves upwardly from the pin 48, the camming member 43 will move under the influence of the coil springs 42 causing balls 38 to lock in the detent groove 94 formed in the drive rod 77. Upward movement of base 19 will also cause a corresponding upward movement of the stripper assembly 22 and this concurrent upward movement of the stripper assembly and base 19 continues until the ends of blades 18 just clear the upper surface 95 of core 88. At this point in time, the stop carried by rod 77 will engage the fixed stop and further upward travel of rod 77, base 19, and blades 18 will cease. However, the friction coupling between rods 76 and 77 will permit rod 76 to continue its upward movement. Thus, once the rod 76 has moved along the bore 96 in base 19, and as the upper surface 97 of rod 76 engages surface 98 of the stripper assembly, continued movement of rod 76 will raise the stripper assembly upwardly until the windings 91 have been axially placed in the axially extending slots of the magnetic core 88 and shed over the top of the free ends of the blades 18. It will be appreciated that movement of the stripper assembly 22 upwardly relative to the base 19 (after base 19 has stopped moving) will permit the springs 33 to actuate the camming device so that the balls 28 will seat in the groove 98 in rod 76 and lock the stripper assembly to the rod 76. At the end of the upper stroke of rod 76, the coil injection machine (as will be understood by persons skilled in the art) automatically retracts rod 76. At this time, the stripper assembly is returned with rod 76 because of the interlocking relationship between the balls 28 and groove 98. Then, as the stripper assembly once again seats against the base 19, the springs 33 are compressed, and balls 28 release the rod 76. Prior to this time, downward movement of rod 76 would have, through the friction coupling, also driven rod 77 downwardly toward its rest position and downward movement of rod 77 will cause the cam lock mechanism of base 19 to engage pin 44, whereupon balls 38 will release rod 77 for continued downward movement. Thus, at the end of the coil injection cycle the rods 76, 77 will once again return to the relative positions thereof shown in FIG. 5.

From the foregoing, it will now be appreciated that I have disclosed a new and improved method of utilizing a coil injection tool pack which is usable in connection with the fabrication of wound magnetic cores. More specifically, the foregoing description has been directed primarily to apparatus and methods that are of particular value and utility in conjunction with the manufacture of dynamo-electric machine stators—and particularly wound stator assemblies for small electric motors—i.e., motors typically having a horsepower rating in the range of from about one-eighth horsepower to perhaps ten horsepower. It should also now be understood that I have disclosed a new and improved coil injection machine power unit having a pair of axially movable power transmitting members that may be used to drivingly engage at least a portion of a coil injection tooling assembly or tool pack. In preferred coil injection machine power units, nest means are provided for receiving the coil injection tooling assembly and means are also provided for holding the assembly at the nest means. In the illustrated embodiment, such means for holding include the previously mentioned clamp arms. Of course, the coil injection machine power unit may also include a wedge magazine which may or may not be usable depending upon whether the user of the equipment is interested in placing wedges at generally the same time that windings are placed on a magnetic core. With specific reference to FIG. 4, it is to be understood that the nest means thereshown includes the movable surface of the outer ring 71 and also includes alignment means in the form of the pins 73. Moreover, the springs 99 best shown in FIG. 5 constitute a means for biasing the movable surface (i.e., the top surface of outer ring 71) upwardly so that the movable surface will be in a tool pack receiving position. In addition, the previously discussed clamp means shown as as clamp arms 82, 83 constitute a means for holding the tool assembly at the nest and for holding the movable surface in a depressed position with the springs 99 compressed and the limit switch 100 actuated which maintains the clamp arms 82, 83 in their clamping condition until the coil injection machine has cycled at which time the clamp arms 82, 83 are automatically released.

While the subject matter which is believed to constitute the presently disclosed inventions has been described in accordance with specific embodiments thereof, variations will be readily apparent to those skilled in the art after reviewing the foregoing description. Thus, while in accordance with the patent statutes what is presently considered to be preferred embodiments of the invention have been described; it is to be understood that this description has been provided for purposes of illustration and not for purposes of limitation. Accordingly, it is intended that the appended claims cover all modifications which come within the spirit and scope of the invention.

What I claim as new and desire to secure by Letters Patent of the United States is:

1. A method of utilizing a coil injection tool pack at least involving placing the tool pack in winding turn receiving relationship with coil winding apparatus having a tool pack nest, wherein the tool pack includes a plurality of elongate elements that mutually define a plurality of axially extending gaps spaced apart about the periphery of the tool pack and a base supporting the elongate elements; said method further comprising: moving the tool pack laterally, relative to the longitudinal extent of the elongate elements, toward the tool pack nest; disposing a portion of the base adjacent to tool pack retainer means, and disposing the tool pack in overlying relationship with respect to aligning means for assuring mutual alignment of the tool pack and the tool pack nest while also disposing the tool pack in overlying relationship with respect to a movable support located at the tool pack nest; moving both the aligning means and the movable support axially, relative to the longitudinal extent of the elongate elements, and thereby causing the aligning means to assure mutual alignment of the tool pack and tool pack nest, and thereby also clamping at least a portion of the base against the tool pack retainer means.

2. The method of claim 1 further including the step of placing at least a first plurality of turns of electrical conductor along at least first preselected ones of the axially extending gaps.

3. The method of claim 2 further including the steps of indexing the tool pack about a longitudinally extending axis after the first plurality of turns are placed along the first preselected ones of the axially extending gaps; and placing a second plurality of conductor turns along second preselected ones of the axially extending gaps.

4. The method of claim 3 further including unclamping the tool pack base and moving the tool pack laterally, relative to the longitudinal extent of the elongate elements, away from the tool pack nest.

5. The method of claim 2 further including unclamping the tool pack base and moving the tool pack laterally, relative to the longitudinal extent of the elongate elements, away from the tool pack nest.

6. The method of claim 5 further including transporting the took pack with winding turns supported thereon to a second tool pack nest at a coil injection station; clamping at least a portion of the base of the tool pack at the second tool pack nest; placing an axially slotted magnetic core on the tool pack; transferring the at least a first plurality of turns of an electrical conductor from the tool pack to the magnetic core; removing the core and at least a first plurality of turns from the tool pack; unclamping the tool pack; and transporting the tool pack away from the second tool pack nest.

7. A method of utilizing a coil injection tool pack at least involving placing the tool pack in winding turn receiving relationship with coil winding apparatus having a tool pack nest, wherein the tool pack includes a plurality of elongate elements that mutually define a plurality of axially extending gaps spaced apart about the periphery of the tool pack and a base supporting the elongate elements; said method further comprising: moving the tool pack laterally, relative to the longitudinal extent of the elongate elements, toward the tool pack nest; disposing a portion of the base adjacent to tool pack retainer means, and disposing the tool pack in overlying relationship with respect to a movable support located at the tool pack nest; moving the movable support, axially relative to the longitudinal extent of the elongate elements, and thereby clamping at least a portion of the base against the tool pack retainer means.

8. The method of claim 7 further including disposing the tool pack in overlying relationship with respect to aligning means for assuring mutual alignment of the tool pack and tool pack nest before moving the movable support; and wherein moving the movable support causes movement of the aligning means.

9. The method of claim 7 further including the step of placing at least a first plurality of turns of electrical conductor along at least first preselected ones of the axially extending gaps.

10. The method of claim 9 further including the steps of indexing the tool pack about a longitudinally extending axis after the first plurality of turns are placed along the first preselected ones of the axially extending gaps; and placing a second plurality of conductor turns along second preselected ones of the axially extending gaps.

11. The method of claim 10 further including unclamping the tool pack base and moving the tool pack laterally, relative to the longitudinal extent of the elongate elements, away from the took pack nest.

12. The method of claim 9 further including unclamping the tool pack base and moving the tool pack laterally, relative to the longitudinal extent of the elongate elements, away from the tool pack nest.

13. A method of utilizing a coil injection tool pack, having a plurality of elongate elements and a base supporting the elongate elements, with coil injection apparatus having a tool pack nest and also having actuator means movable within the nest; said method comprising: transporting the tool pack to the tool pack nest and into overlying relationship with the nest by moving the tool pack laterally relative to the longitudinal extent of the elongate elements; depressing a portion of the tool pack nest, and thereby actuating clamp means and clamping the tool pack to the nest; and thereafter moving the actuator means into engagement with selected parts of the tool pack.

14. In a coil injection machine power unit having at least one axially movable power transmitting member adapted to drivingly engage at least a portion of a coil injection tooling assembly, the improvement comprising: nest means for receiving the coil injection tooling assembly and having a movable surface, means for holding the coil injection tooling assembly at said nest means, alignment means for assuring a predetermined alignment of the coil injection tooling assembly with said nest means, and means for biasing said movable surface to a coil injection tooling assembly receiving position.

15. The apparatus of claim 14 wherein the means for holding includes at least one clamp arm.

16. The apparatus of claim 14 wherein the power unit includes a wedge magazine and alignment means, and the nest means includes a tool assembly supporting surface movable relative to the alignment means.

17. The apparatus of claim 14 wherein said means for holding comprises at least one clamp arranged to hold the coil injection tooling assembly at said nest means and also to hold said movable surface in a depressed position relative to the power unit, with said biasing means being held in a compressed state.

18. The apparatus of claim 14 wherein said biasing means comprises at least one compression spring.

19. The apparatus of claim 14 wherein said movable surface is defined by a movable ring.

20. In a winding machine having a winding head for developing winding turns, the improvement comprising: a tool pack nest comprising a first tool pack supporting surface, a second tool pack supporting surface, and tool pack retaining means overlying the first supporting surface; said second tool pack supporting surface being movable toward said retaining means for raising a tool pack from the first supporting surface and into clamped engagement with the retaining means.

21. The apparatus of claim 20 wherein the nest further includes means for assuring alignment of a tool pack at the tool pack nest.

22. The apparatus of claim 21 wherein the means for assuring alignment inhibits movement of the second tool pack supporting surface when a misaligned tool pack condition exists.

23. The apparatus of claim 22 wherein the means for assuring alignment comprises at least one alignment pin carried by said second tool pack supporting surface.

24. A transportable tool pack for use at at least one coil winding station, at least one coil injection station, and particularly suitable for use in the manufacture of fractional horsepower electric motor stators; said tool pack comprising: a wedge guide housing; a plurality of wedge guides; a plurality of elongate gap defining members; a first base interconnected with the gap defining members and movable therewith relative to the wedge guides; a second base for supporting the wedge guide housing; and means for limiting movement of the first base relative to the wedge guides in at least one direction; said first base including means for interfitting with a movable portion of a coil injection machine power unit.

25. The tool pack of claim 24 further comprising a stripper assembly supported within the plurality of elongate gap defining members.

26. The tool pack of claim 24 wherein the stripper assembly includes means for interfitting with a movable portion of a coil injection machine power unit.

27. The tool pack of claim 26 wherein the second base includes means for assuring alignment with a winding machine nest.

28. A method of utilizing a coil injection tool pack at least involving placing the tool pack in winding turn receiving relationship with coil winding apparatus having a tool pack nest, wherein the tool pack includes a plurality of elongate elements that mutually define a plurality of axially extending gaps spaced apart about the periphery of the tool pack and a base supporting the elongate elements, the method further comprising: moving the tool pack laterally, relative to the longitudinal extent of the elongate elements, toward the tool pack nest; disposing a portion of the base adjacent to tool pack retainer means, and disposing the tool pack in overlying relationship with respect to aligning means for assuring mutual alignment of the tool pack and the tool pack nest; moving the aligning means axially, relative to the longitudinal extent of the elongate elements, and thereby causing the aligning means to assure mutual alignment of the tool pack and tool pack nest; clamping at least a portion of the base against the tool pack retainer means; placing at least a first plurality of turns of an electrical conductor along at least first preselected ones of the axially extending gaps; unclamping the tool pack base and moving the tool pack laterally, relative to the longitudinal extent of the elongate elements, away from the tool pack nest; transporting the tool pack with the winding turns supported thereon to a second tool pack nest at a coil injection station; aligning the tool pack at the second tool pack nest, depressing the second tool pack nest, and thereby actuating tool pack clamping means for clamping at least a portion of the base of the tool pack at the second tool pack nest; placing an axially slotted magnetic core on the tool pack; transferring the at least a first plurality of turns of the electrical conductor from the tool pack to the magnetic core; removing the core and the at least a first plurality of turns from the tool pack; unclamping the tool pack at the second tool pack nest; and transporting the tool pack away from the second tool pack nest.

* * * * *